US009641350B2

(12) United States Patent
Johnsen et al.

(10) Patent No.: US 9,641,350 B2
(45) Date of Patent: May 2, 2017

(54) SYSTEM AND METHOD FOR SUPPORTING A SCALABLE FLOODING MECHANISM IN A MIDDLEWARE MACHINE ENVIRONMENT

(75) Inventors: Bjørn Dag Johnsen, Oslo (NO); Martin Paul Mayhead, Hindhead (GB); Ola Tørudbakken, Oslo (NO)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 347 days.

(21) Appl. No.: 13/546,261

(22) Filed: Jul. 11, 2012

(65) Prior Publication Data

US 2013/0016719 A1    Jan. 17, 2013

Related U.S. Application Data

(60) Provisional application No. 61/506,557, filed on Jul. 11, 2011.

(51) Int. Cl.
*G06F 15/16* (2006.01)
*G06F 9/50* (2006.01)
(Continued)

(52) U.S. Cl.
CPC ...... *H04L 12/1863* (2013.01); *H04L 12/6402* (2013.01); *H04L 67/2814* (2013.01);
(Continued)

(58) Field of Classification Search
CPC . H04L 63/0227; H04L 63/02; H04L 12/4641; H04L 45/55; H04L 47/10;
(Continued)

(56) References Cited

U.S. PATENT DOCUMENTS 5,758,083 A    5/1998  Singh
6,012,100 A    1/2000  Frailong
(Continued)

FOREIGN PATENT DOCUMENTS

CN    1514625    7/2004
CN    1520556    8/2004
(Continued)

OTHER PUBLICATIONS

Lee, M. et al., "Security Enhancement in Infiniband Architecture," Proceedings of the 19th IEEE International Parallel and Distributed Processing Symposium, Denver, Colorado, Apr. 4-8, 2005, Piscataway, New Jersey, Apr. 4, 2005, 18 pages.
(Continued)

*Primary Examiner* — Wutchung Chu
(74) *Attorney, Agent, or Firm* — Tucker Ellis LLP

(57) ABSTRACT

A system and method can support a scalable packet forwarding mechanism in a middleware machine environment. The middleware machine environment can comprise one or more network switch instances, wherein each network switch instance is associated with one or more external ports that are adapted to receive data packets from an external network. Furthermore, the middleware machine environment can comprise a plurality of packet dispatching components, each of which is responsible for forwarding a data packet to a virtual machine on a host server that operates to process the data packet. Additionally, a link aggregation component can combine multiple external ports into a logical port, and wherein the bandwidth of the logical port is linearly scaled accordingly to a total number of the multiple external ports.

12 Claims, 9 Drawing Sheets

(51) Int. Cl.
*H04L 12/18* (2006.01)
*H04L 29/08* (2006.01)
*H04L 12/54* (2013.01)
*H04L 12/64* (2006.01)
*H04L 12/933* (2013.01)

(52) U.S. Cl.
CPC ...... *H04L 12/1836* (2013.01); *H04L 12/5696* (2013.01); *H04L 12/64* (2013.01); *H04L 49/10* (2013.01)

(58) Field of Classification Search
CPC . H04L 49/351; H04L 49/354; H04L 41/0893; H04L 12/185; G06F 9/45533; G06F 9/4856; G06F 2009/4557; G06F 2009/45595; G06F 9/45558; H04B 10/27; H04Q 2011/0047; H04Q 2011/009; H04Q 3/0083
USPC ....... 709/203, 217, 227, 229, 250, 226, 208, 709/224, 223; 370/390, 400
See application file for complete search history.

(56) References Cited

U.S. PATENT DOCUMENTS

| | | | |
|---|---|---|---|
| 6,038,233 A * | 3/2000 | Hamamoto et al. | 370/401 |
| 6,098,098 A | 8/2000 | Sandahl | |
| 6,148,336 A | 11/2000 | Thomas | |
| 6,282,678 B1 | 8/2001 | Snay | |
| 6,286,038 B1 | 9/2001 | Reichmeyer | |
| 6,308,148 B1 * | 10/2001 | Bruins et al. | 703/27 |
| 6,314,531 B1 | 11/2001 | Kram | |
| 6,343,320 B1 | 1/2002 | Fairchild | |
| 6,658,016 B1 | 12/2003 | Dai | |
| 6,658,579 B1 | 12/2003 | Bell | |
| 6,697,360 B1 | 2/2004 | Gai | |
| 6,826,694 B1 * | 11/2004 | Dutta et al. | 726/13 |
| 6,941,350 B1 | 9/2005 | Frazier | |
| 6,981,025 B1 | 12/2005 | Frazier et al. | |
| 7,023,795 B1 | 4/2006 | Hwu | |
| 7,113,995 B1 | 9/2006 | Beukema et al. | |
| 7,290,277 B1 | 10/2007 | Chou et al. | |
| 7,398,394 B1 | 7/2008 | Johnsen | |
| 7,409,432 B1 | 8/2008 | Recio | |
| 7,577,996 B1 | 8/2009 | Merchant et al. | |
| 7,636,772 B1 | 12/2009 | Kirby | |
| 7,721,324 B1 | 5/2010 | Jackson | |
| 7,792,987 B1 | 9/2010 | Vohra et al. | |
| 7,843,906 B1 * | 11/2010 | Chidambaram et al. | 370/386 |
| 7,860,006 B1 | 12/2010 | Kashyap | |
| 7,894,440 B2 * | 2/2011 | Xu et al. | 370/392 |
| 8,149,834 B1 | 4/2012 | Nielsen et al. | |
| 8,391,289 B1 * | 3/2013 | Yalagandula | H04L 12/2818 370/392 |
| 8,645,524 B2 | 2/2014 | Pearson | |
| 8,842,518 B2 | 9/2014 | Johnsen | |
| 2002/0016858 A1 | 2/2002 | Sawada | |
| 2002/0133620 A1 | 9/2002 | Krause | |
| 2003/0005039 A1 | 1/2003 | Craddock | |
| 2003/0051026 A1 * | 3/2003 | Carter | H04L 12/24 709/224 |
| 2003/0105914 A1 | 6/2003 | Dearth et al. | |
| 2004/0013088 A1 | 1/2004 | Gregg | |
| 2004/0028047 A1 | 2/2004 | Hou | |
| 2004/0037279 A1 * | 2/2004 | Zelig et al. | 370/390 |
| 2004/0078709 A1 | 4/2004 | Beukema | |
| 2004/0103282 A1 | 5/2004 | Meier et al. | |
| 2004/0123142 A1 | 6/2004 | Dubal et al. | |
| 2004/0168089 A1 | 8/2004 | Lee | |
| 2004/0199764 A1 | 10/2004 | Koechling | |
| 2005/0071709 A1 | 3/2005 | Rosenstock | |
| 2005/0100033 A1 | 5/2005 | Arndt | |
| 2005/0108434 A1 | 5/2005 | Witchey | |
| 2005/0163115 A1 | 7/2005 | Dontu et al. | |
| 2005/0198371 A1 | 9/2005 | Smith et al. | |
| 2006/0215673 A1 | 9/2006 | Olvera-Hernandez | |
| 2006/0230219 A1 | 10/2006 | Njoku | |
| 2006/0248200 A1 | 11/2006 | Stanev | |
| 2007/0022479 A1 | 1/2007 | Sikdar et al. | |
| 2007/0036178 A1 | 2/2007 | Hares | |
| 2007/0038703 A1 | 2/2007 | Tendjoukian | |
| 2007/0073882 A1 | 3/2007 | Brown | |
| 2007/0140266 A1 | 6/2007 | Njoku | |
| 2007/0162520 A1 | 7/2007 | Petersen et al. | |
| 2007/0180497 A1 | 8/2007 | Popescu et al. | |
| 2007/0198656 A1 | 8/2007 | Mazzaferri et al. | |
| 2007/0280104 A1 | 12/2007 | Miyoshi | |
| 2007/0294405 A1 | 12/2007 | Mohindra et al. | |
| 2008/0049764 A1 | 2/2008 | Solomon et al. | |
| 2008/0159277 A1 | 7/2008 | Vobbilisetty | |
| 2008/0163124 A1 | 7/2008 | Bonev | |
| 2008/0267183 A1 | 10/2008 | Arndt | |
| 2008/0301256 A1 | 12/2008 | McWilliams | |
| 2009/0003317 A1 * | 1/2009 | Kasralikar | H04L 63/1408 370/352 |
| 2009/0019505 A1 | 1/2009 | Gopalakrishnan | |
| 2009/0070448 A1 | 3/2009 | Pearson | |
| 2009/0073895 A1 | 3/2009 | Morgan | |
| 2009/0080328 A1 | 3/2009 | Hu | |
| 2009/0216910 A1 * | 8/2009 | Duchesneau | G06F 9/5072 709/250 |
| 2009/0222558 A1 | 9/2009 | Xu et al. | |
| 2009/0234974 A1 | 9/2009 | Arndt | |
| 2009/0262741 A1 * | 10/2009 | Jungck et al. | 370/392 |
| 2010/0008291 A1 | 1/2010 | LeBlanc | |
| 2010/0054129 A1 | 3/2010 | Kuik | |
| 2010/0103837 A1 | 4/2010 | Jungck | |
| 2010/0107162 A1 | 4/2010 | Edwards | |
| 2010/0118868 A1 * | 5/2010 | Dabagh | H04L 49/9042 370/389 |
| 2010/0138532 A1 | 6/2010 | Glaeser | |
| 2010/0146093 A1 * | 6/2010 | Kuik | H04L 49/70 709/223 |
| 2010/0228961 A1 | 9/2010 | Burns | |
| 2010/0257269 A1 | 10/2010 | Clark | |
| 2010/0275199 A1 | 10/2010 | Smith et al. | |
| 2010/0287548 A1 | 11/2010 | Zhou et al. | |
| 2010/0306408 A1 | 12/2010 | Greenberg | |
| 2010/0325257 A1 | 12/2010 | Goel | |
| 2011/0023108 A1 | 1/2011 | Geldermann et al. | |
| 2011/0131447 A1 | 6/2011 | Prakash et al. | |
| 2011/0239268 A1 * | 9/2011 | Sharp et al. | 726/1 |
| 2011/0246669 A1 | 10/2011 | Kanada et al. | |
| 2011/0268117 A1 | 11/2011 | Davis | |
| 2011/0299537 A1 | 12/2011 | Saraiya et al. | |
| 2012/0103837 A1 * | 5/2012 | Wall et al. | 205/793 |
| 2012/0131225 A1 | 5/2012 | Chiueh et al. | |
| 2012/0147894 A1 * | 6/2012 | Mulligan et al. | 370/395.53 |
| 2012/0173757 A1 | 7/2012 | Sanden | |
| 2012/0265976 A1 * | 10/2012 | Spiers et al. | 713/2 |
| 2012/0278804 A1 * | 11/2012 | Narayanasamy et al. | 718/1 |
| 2012/0291028 A1 | 11/2012 | Kidambi et al. | |
| 2012/0307826 A1 | 12/2012 | Matsuoka | |
| 2012/0314706 A1 | 12/2012 | Liss | |
| 2012/0320929 A9 | 12/2012 | Subramanian | |
| 2012/0331127 A1 * | 12/2012 | Wang et al. | 709/224 |
| 2012/0331142 A1 | 12/2012 | Mittal et al. | |
| 2013/0016718 A1 | 1/2013 | Johnsen | |
| 2013/0036136 A1 | 2/2013 | Horii | |
| 2013/0077492 A1 | 3/2013 | Scaglione | |
| 2013/0232492 A1 | 9/2013 | Wang | |
| 2014/0115584 A1 * | 4/2014 | Mudigonda et al. | 718/1 |
| 2014/0223431 A1 * | 8/2014 | Yoshimura et al. | 718/1 |

FOREIGN PATENT DOCUMENTS

| | | |
|---|---|---|
| CN | 1536842 | 10/2004 |
| CN | 1617526 | 5/2005 |
| CN | 101123498 A | 2/2008 |

(56) References Cited

FOREIGN PATENT DOCUMENTS

| EP | 1 128 607 A2 | 8/2001 |
|---|---|---|
| EP | 2160068 A1 | 3/2010 |
| WO | 2012037518 | 3/2012 |

OTHER PUBLICATIONS

Sun Infiniband Dual Port 4x QDR PCIe ExpressModule and Low Profile Host Channel Adapters M2, Frequently Asked Questions, Sep. 21, 2010, http://www.oracle.com/us/products/servers-storage/networking/infiniband/sun-qdr-ib-hcas-faq-172841.pdf, retrieved on Sep. 11, 2012, 4 pages.
International Search Report dated Sep. 23, 2013 for Application No. PCT/US2013/040639, 10 pages.
International Searching Authority at the European Patent Office, International Search Report and Written Opinion for PCT International Application No. PCT/US2012/046225, Oct. 11, 2012, 10 pages.
International Searching Authority at the European Patent Office, International Search Report and Written Opinion for PCT International Application No. PCT/US2012/046219, Mar. 1, 2013, 10 pages.
International Search Report dated Sep. 26, 2013 for Application No. PCT/US2013/040656, 10 pages.
State Intellectual Property Office of the People's Republic of China, Search Report for Chinese Patent Application No. 201280030334.2, Office Action dated Aug. 21, 2015, 2 pages.
State Intellectual Property Office of the People's Republic of China, Search Report for Chinese Patent Application No. 201280027279.1, Office Action dated Sep. 9, 2015, 2 pages.
State Intellectual Property Office of the People's Republic of China, Search Report for Chinese Patent Application No. 201280030335.7, Office Action dated Dec. 28, 2015.
Notice of Allowance issued by United States Patent and Trademark Office on U.S. Appl. No. 13/546,236, mailed Mar. 9, 2016.
Notice of Allowance issued by United Sates Patent and Trademark Office on U.S. Appl. No. 13/892,162, mailed May 19, 2016 (9 pages).
State Intellectual Property Office of the People's Republic of China, Search Report for Chinese Patent Application No. 201380014177.0, Office Action dated Jun. 1, 2016, 2 pages.
Office Action issued by United States Patent and Trademark Office for U.S. Appl. No. 13/892,133, mailed Aug. 22, 2016 (16 pages).
Notice of Allowance issued by United States Patent and Trademark Office for U.S. Appl. No. 13/892,174, mailed Oct. 5, 2016 (9 pages).
State Intellectual Property Office of The People's Republic of China, Search Report for Chinese Patent Application No. 201380014173.2, Office Action Dated Oct. 19, 2016, 11 pages.

\* cited by examiner

SYSTEM AND METHOD FOR SUPPORTING A SCALABLE FLOODING MECHANISM IN A MIDDLEWARE MACHINE ENVIRONMENT

CLAIM OF PRIORITY

This application claims priority to U.S. Provisional Patent Application No. 61/506,557, entitled "SYSTEM AND METHOD FOR USING UNICAST AND MULTICAST FLOODING MECHANISMS TO PROVIDE EoIB GATEWAY vNICs" filed Jul. 11, 2011, which application is herein incorporated by reference.

CROSS REFERENCE TO RELATED APPLICATIONS

The application is related to the following patent applications, which are hereby incorporated by reference in its entirety:

U.S. patent application Ser. No. 13/546,217, entitled "SYSTEM AND METHOD FOR USING A MULTICAST GROUP TO SUPPORT A FLOODING MECHANISM IN A MIDDLEWARE MACHINE ENVIRONMENT," filed Jul. 11, 2012;

U.S. patent application Ser. No. 13/546,236, entitled "SYSTEM AND METHOD FOR USING A PACKET PROCESS PROXY TO SUPPORT A FLOODING MECHANISM IN A MIDDLEWARE MACHINE ENVIRONMENT," filed Jul. 11, 2012;

U.S. patent application Ser. No. 13/546,368, entitled "SYSTEM AND METHOD FOR SUPPORTING DIRECT PACKET FORWARDING IN A MIDDLEWARE MACHINE ENVIRONMENT," filed Jul. 11, 2012; and U.S. patent application Ser. No. 13/546,405, entitled "SYSTEM AND METHOD FOR SUPPORTING VIRTUAL MACHINE MIGRATION IN A MIDDLEWARE MACHINE ENVIRONMENT," filed Jul. 11, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a middleware machine environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein are systems and methods for supporting a scalable packet forwarding mechanism in a middleware machine environment. The middleware machine environment can comprise one or more network switch instances, wherein each network switch instance is associated with one or more external ports that are adapted to receive data packets from an external network. Furthermore, the middleware machine environment can comprise a plurality of packet dispatching components, each of which is responsible for forwarding a data packet to a virtual machine on a host server that operates to process the data packet. Additionally, a link aggregation component can combine multiple external ports into a logical port, and wherein the bandwidth of the logical port is linearly scaled accordingly to a total number of the multiple external ports.

DETAILED DESCRIPTION

Described herein is a system and method for providing a middleware machine or similar platform. In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or WebLogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

Middleware Machine Environment

Figure 1:
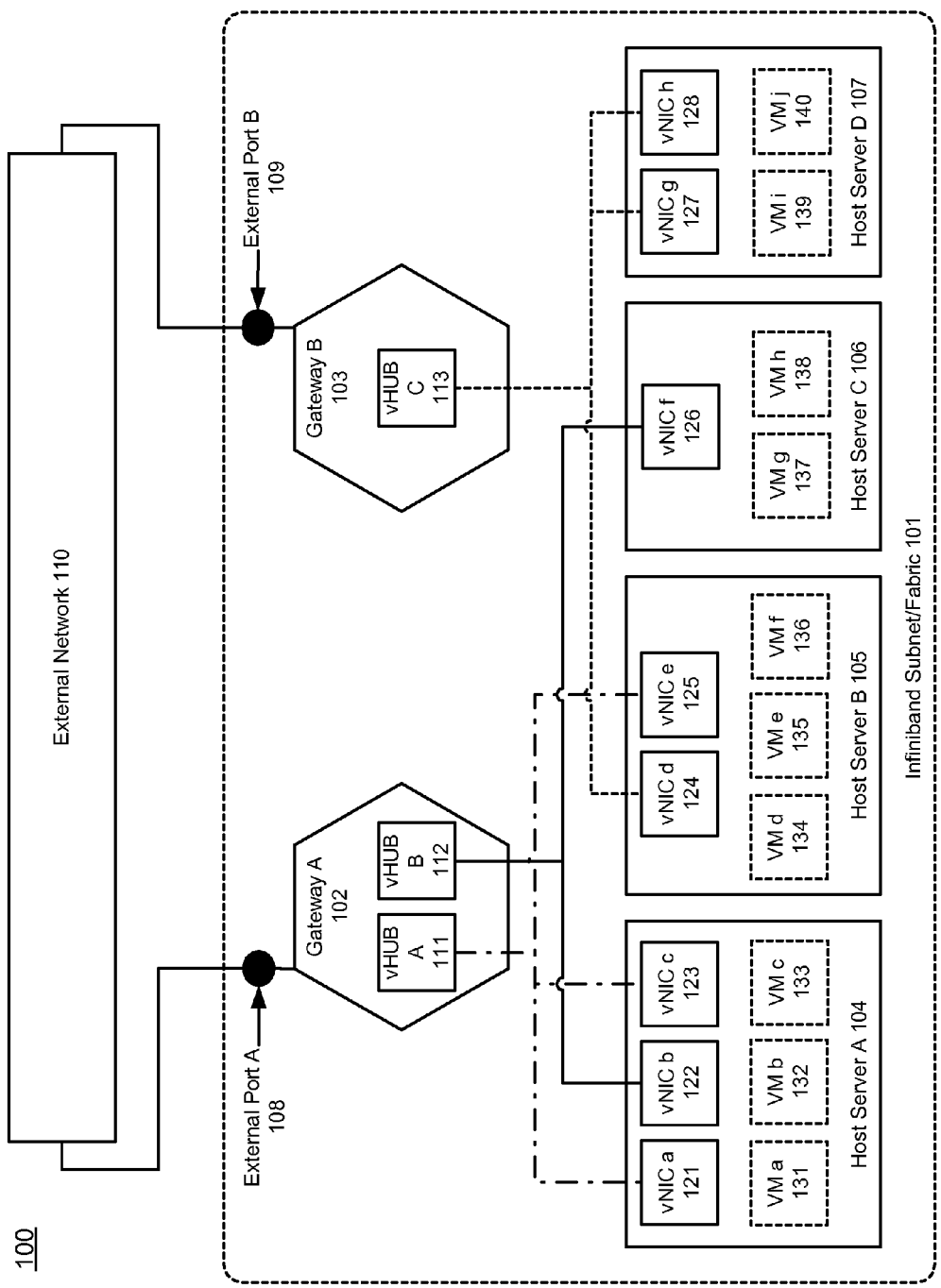
FIG. 1 shows an illustration of a middleware machine environment, in accordance with an embodiment of the invention.

FIG. 1 shows an illustration of a middleware machine environment, in accordance with an embodiment of the invention. As shown in FIG. 1, a middleware machine environment 100 can include an IB fabric 101 that connects to an external network 110 using one or more gateway instances 102-103. The IB fabric also includes a plurality of host servers 104-107 (each of which can be hardware itself or software running on top of a physical host server), which contains a plurality of virtual machines (VMs) 131-140. Each gateway instance A-B 102-103 can be associated with an external port 108-109 that can receive data packets from the external network 110. As shown in FIG. 1, external port A 108 is associated with gateway instance A 102, and external port B 109 is associated with gateway instance B 103.

Additionally, the host servers provides a plurality of virtual interfaces, such as virtual network interface cards (vNICs) 121-128, for receiving data packets from the external network via the gateway instances A-B 102-103. The gateway instances 102-103 can define and maintain one or more virtual hubs (vHUBs) 111-113, each of which defines a logical layer 2 (L2) link on the IB fabric side that contains vNICs associated with the same gateway instance. Furthermore, the vNICs and the hosts that belong to the same vHUB can communicate with each other without involving the associated gateway instance.

As shown in FIG. 1, vHUB A 111 on gateway A is associated with vNIC a 121 and vNIC c 123 on host server A, and vNIC e 125 on host server B. Also, vHUB B 112 on gateway A is associated with vNIC b 122 on host server A and vNIC f 126 on host server C; and vHUB C 113 on gateway B is associate with vNIC d 124 on host server B, and vNIC g 127 and vNIC h 128 on host server D.

Figure 2:
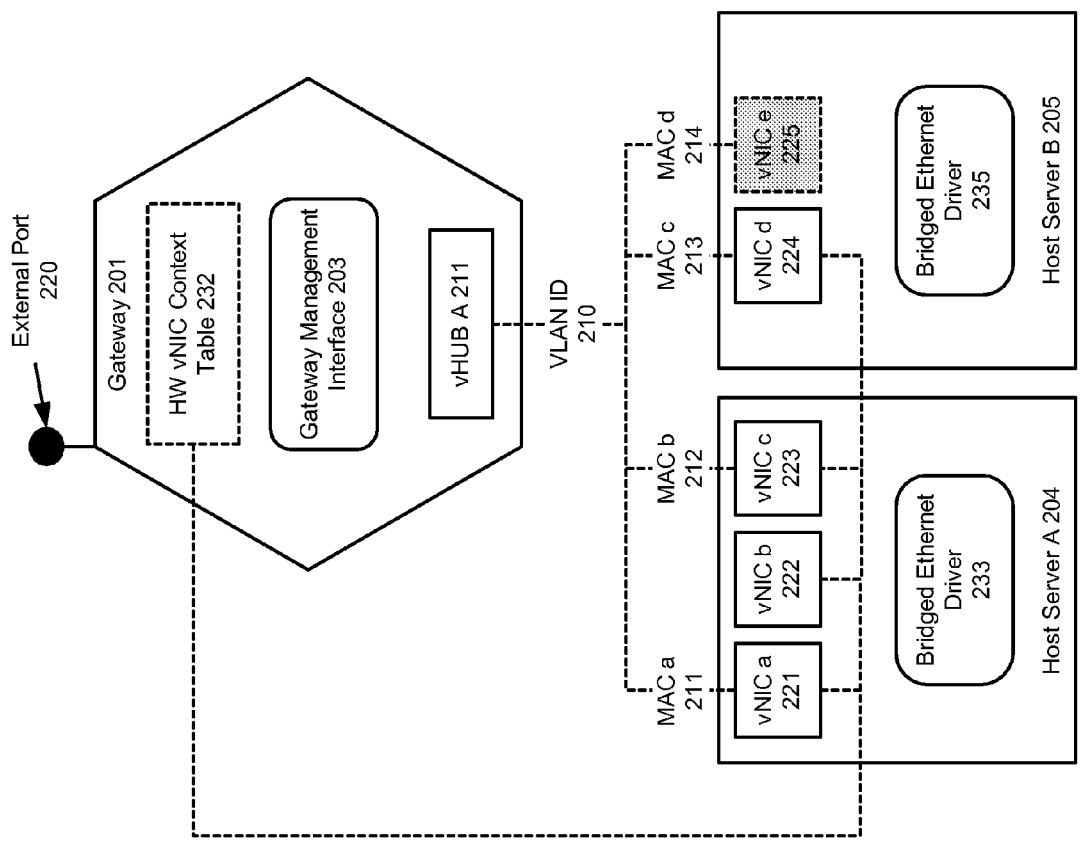
FIG. 2 shows an illustration of a virtual hub (vHUB) that includes various vNICs associated with different types of context in a middleware machine environment, in accordance with an embodiment of the invention.

FIG. 2 shows an illustration of a virtual hub (vHUB) that includes various vNICs, in accordance with an embodiment of the invention. As shown in FIG. 2, a middleware machine environment 200 includes a gateway instance 201 and several host servers 204-205 or hypervisors. The gateway instance 201, which comprises an external port 220, can maintain a virtual hub (vHUB), vHUB A 211. The vHUB A 211 can be assigned with a unique virtual LAN ID (VLAN ID) 210. Additionally, the vHUB A 211 can include various vNICs 221, 223-225, each of which is assigned with a Media Access Control (MAC) address 211-214. Each logical vNIC 221, 223-225 can be represented by a MAC/VLAN ID combination associated with a specific Host Channel Adaptor (HCA) port.

A vNIC in the IB fabric can be uniquely identified using a virtual Ethernet interface (VIF), which includes a combination of a VLAN ID and a MAC address. Also, when the VIFs are used concurrently in the same vHub in a gateway instance, different MAC addresses are used for the different VIFs. Additionally, the system can perform an address translation from an Ethernet layer 2 MAC address to an IB layer 2 address that uses local identifier (LID)/global identifier (GID) and queue pair number (QPN).

Furthermore, the gateway instance 201 can include a hardware vNIC context table 232, which contains various entries or hardware vNIC contexts. The hardware vNIC context table 232 can be stored in a memory of the gateway instance 201. When a host driver is sending packets to the external Ethernet via the IB fabric and the gateway 201, this hardware vNIC context table 232 can be used to verify that the correct source address information is used by the correct host. The hardware context table 232 can also be used to look up the correct host HCA port address on the IB fabric and QPN within that HCA, when packets are received by the gateway from the external Ethernet. Additionally, the hardware vNIC contexts can be used to directly steer packets for a specific logical vNIC to a dedicated receive queue in the designated host context/memory.

The gateway instance 201, which can be hardware itself or a software running on top of a hardware switch, allows the use of network managed vNIC allocation. The management interface 203 on the gateway instance 201, e.g. a NM2-GW service processor, can be used to allocate hardware vNIC contexts on behalf of specific host (HCA) ports.

A single vNIC in the IB fabric may or may not be allocated with a hardware vNIC context recorded in the hardware vNIC context table 232. In the example as shown in FIG. 2, vNIC a 221, vNIC b 222, and vNIC c 223 on host server A 204, and vNIC d 224 on host server B 205, can be provided with a hardware vNIC context (i.e. the gateway instance 201 can obtain the correct host HCA port address on the IB fabric and QPN within that HCA for an incoming data packet). Additionally, vNIC e 225 on host server B 205 is not allocated with hardware vNIC context 232 and can only be used in a bridged Ethernet context. In one example, if the complete gateway hardware vNIC contexts in the hardware vNIC context table 232 are consumed by the network managed vNICs, e.g. vNICs a-d 221-224, then all bridge based vNICs, e.g. vNIC e 225, can be flooding based (i.e. not having any dedicated HW vNIC context).

A flooding mechanism can be used to scale the number of logical vNICs beyond the size of the gateway HW vNIC context table. Using the flood-based vNICs, the system allows the same amount of receive queues on the host(s) to receive packets for a large number of logical vNICs. Furthermore, using a flooding mechanism, the system allows schemes where hardware vNIC contexts can be established in the hardware context table 232 after initial packet traffic from the external Ethernet has been received.

Scalable Packet Intermediate Forwarding Mechanism

In accordance with an embodiment of the invention, a link aggregation (LAG) component can be used to combine the multiple external ports into one logical port, the bandwidth of which can be linearly scaled accordingly to the total number of the external ports.

Figure 3:
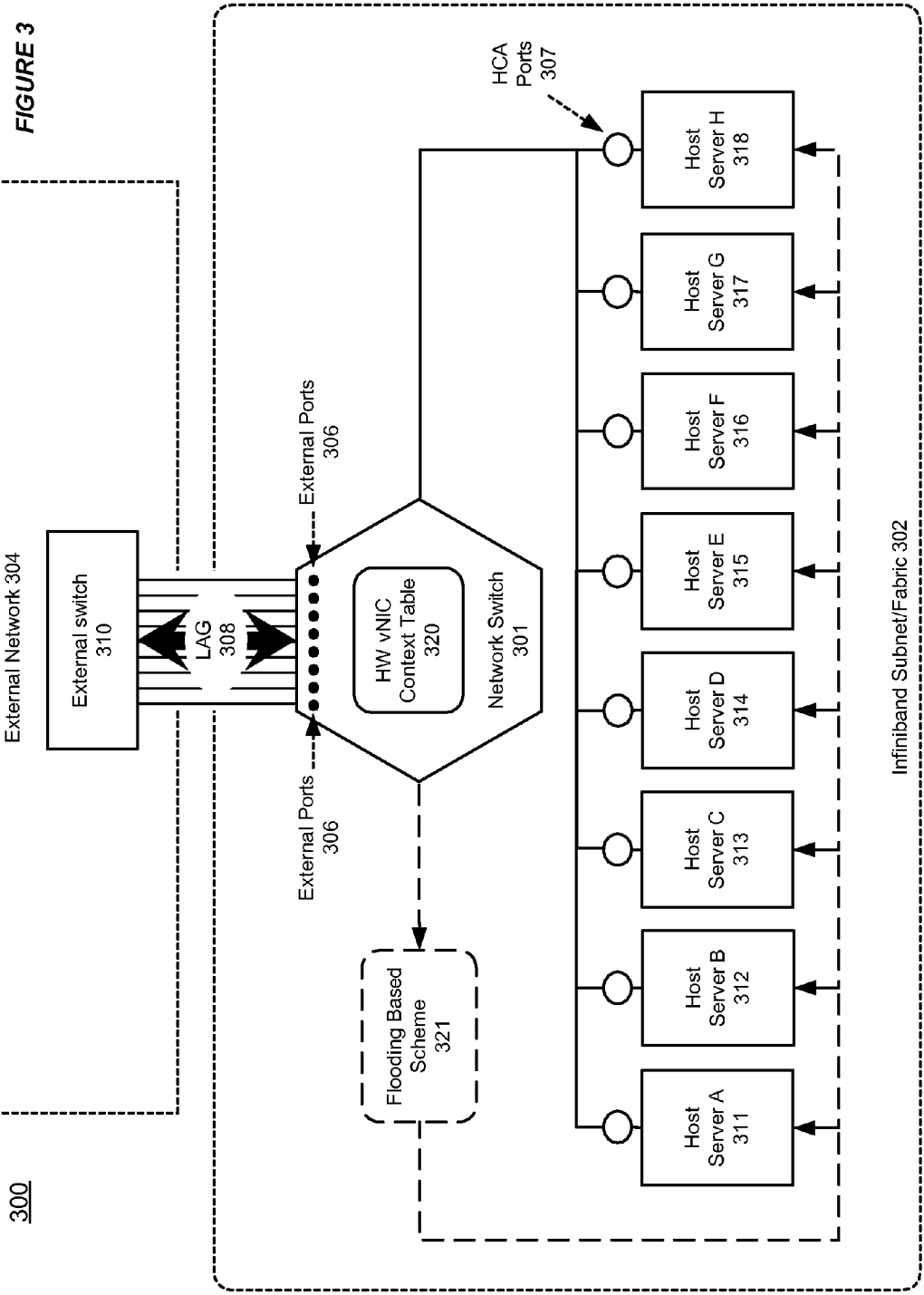
FIG. 3 shows an illustration of a middleware machine environment with a link aggregation (LAG) component, in accordance with an embodiment of the invention.

FIG. 3 shows an illustration of a middleware machine environment with a LAG component, in accordance with an embodiment of the invention. As shown in FIG. 3, a middleware machine environment 300 allows an external switch 310 in an external network 304, e.g. an Ethernet network, to communicate with a network switch 301 in an IB fabric 302 using a LAG component 308. Effectively, the LAG component 308 combines the eight external ports 306 on the network switch 301 into a logical external port. Additionally, the IB fabric 302 includes eight host servers A-H 311-318, each of which connects to the network switch using a Host Channel Adaptor (HCA) port 307.

A constant stream of flood based packets can be sent to each external port 306 on the network switch 301 from the external network 304. Each incoming unicast packet from the external network 304, without hardware context 320, can cause the generation of multiple corresponding IB packets on the IB fabric 302. When a flood based scheme 321 is used for handling an incoming packet, the network switch 301 can send one copy of the incoming packet to each of the HCA ports 307 that shares the network switch instance 301. Thus, in the example as shown in FIG. 3, the network switch 301 may generate eight packets for each flood based packet (i.e. only ⅛ of the received packets on each HCA port represents packets destined for that HCA port).

In addition to the link inefficiency, the IB fabric 302 may also experience performance difficulty that can include significant packet drop due to either overhead for processing small packets received, or bandwidth limitations that overload the target HCA links for transmitting large packets received. For example, as shown in FIG. 3, each 10 gigabit Ethernet (GE) external port may generate 80 gigabits (GB) of IB internal flood traffic.

In accordance with an embodiment of the invention, the overload issue as described above can be avoided by configuring the system to not use LAG 308, in addition to ensuring that each network switch external port 306 is only used by a single physical server A-H 311-318. In such a case, the bandwidth and packet rates can scale with the total number of the external ports 306, since each physical server HCA port 307 is only subject to traffic from a single external port 306.

Figure 4:
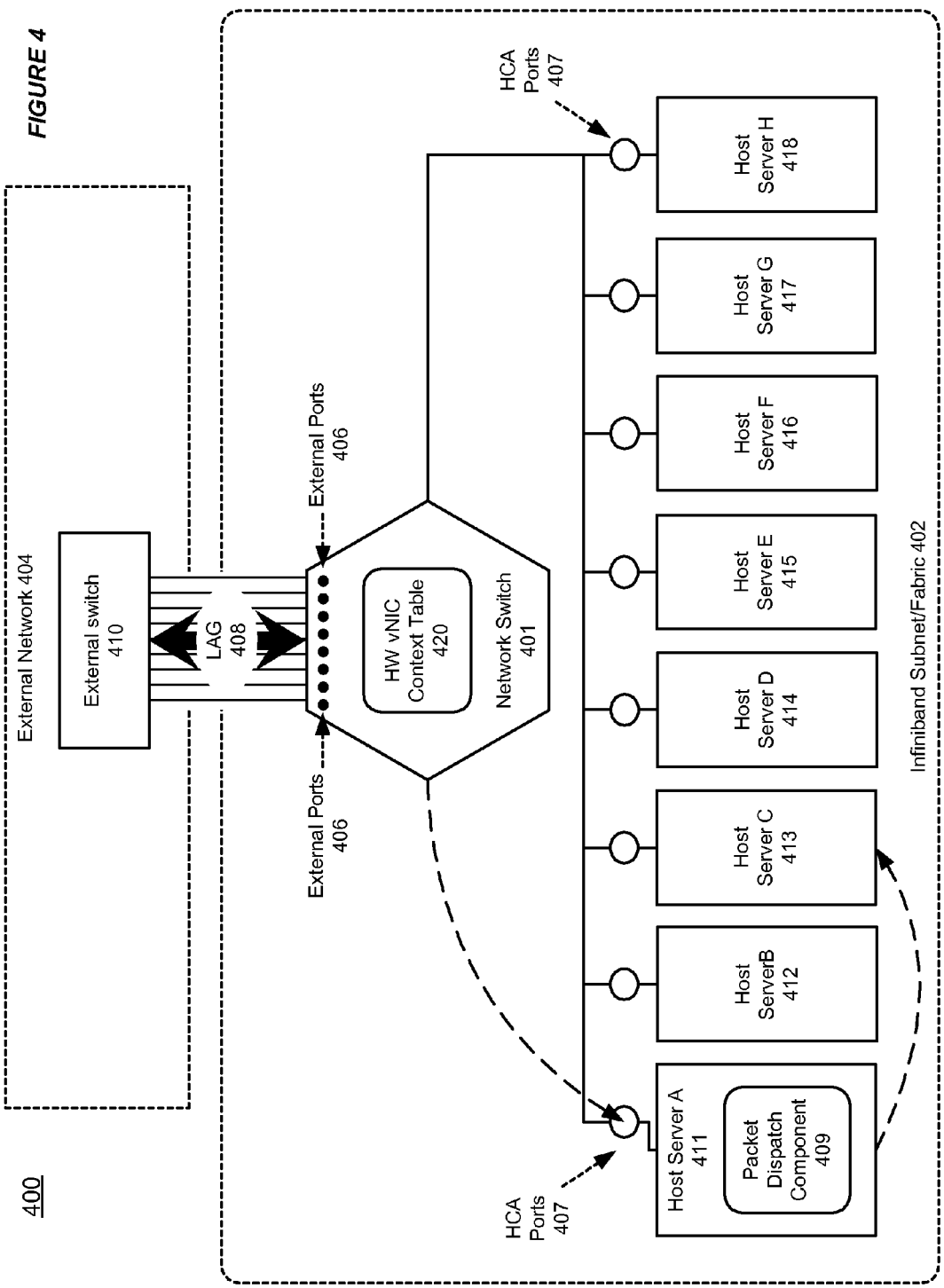
FIG. 4 shows an illustration of supporting a packet intermediate forwarding mechanism in a middleware machine environment, in accordance with an embodiment of the invention.

FIG. 4 shows an illustration of supporting a packet intermediate forwarding mechanism in a middleware machine environment, in accordance with an embodiment of the invention. As shown in FIG. 4, a middleware machine environment 400 allows an external switch 410 in an external network 404 to communicate with a network switch 401 in an IB fabric 402 using a LAG component 408. Additionally, the IB fabric 401 includes multiple host servers, e.g. host servers A-H 411-418, each of which connects to the network switch using a Host Channel Adaptor (HCA) port 407.

The network switch 401 can receive one or more incoming packets at an external port 406. When no dedicated hardware vNIC context in the hardware vNIC context table 420 is available, the network switch 401 can send an incoming flood based packet to a HCA port 407 on the host server A 411, which is a default intermediate destination, or an intermediate forwarding destination (IFD). Then, a packet dispatch component 409, e.g. on the host server A 411, can be responsible for forwarding the incoming flood based packet to the destination virtual machine (VM), or virtual interface (VIF).

In accordance with an embodiment of the invention, each physical server can forward incoming packets to another physical server that should receive the packets. In the example as shown in FIG. 4, the host server A 411, which receives an income flood based packet from the network switch 401, can forward this packet to the host server C 413, which includes a HCA port that can be represented using a corresponding MAC/VLAN combination as shown in FIG. 2. Thus, using the intermediate forwarding scheme described above, on average, ⅞ of the incoming packets are forwarded twice. Such an intermediate forwarding scheme can reduce the overload side effect of using the LAG component, since each HCA port receives less than two times the number of packets that are destined for the HCA port.

Furthermore, if the intermediate forwarding logic is set up to use an IB multicast group destination that all the potential receiver hosts are members of, then the intermediate forwarding scheme can correspond to the flooding mechanism in Ethernet switches.

Additionally, there can be no requirement for direct correspondence between the number of external ports 406 in a LAG component 408 and the number of host servers A-H 411-418 sharing the LAG 408, and the goal to scale the number of MAC/VLAN combinations may be limited by the physical bandwidth provided by the associated external ports 506 and the HCA links.

Figure 5:
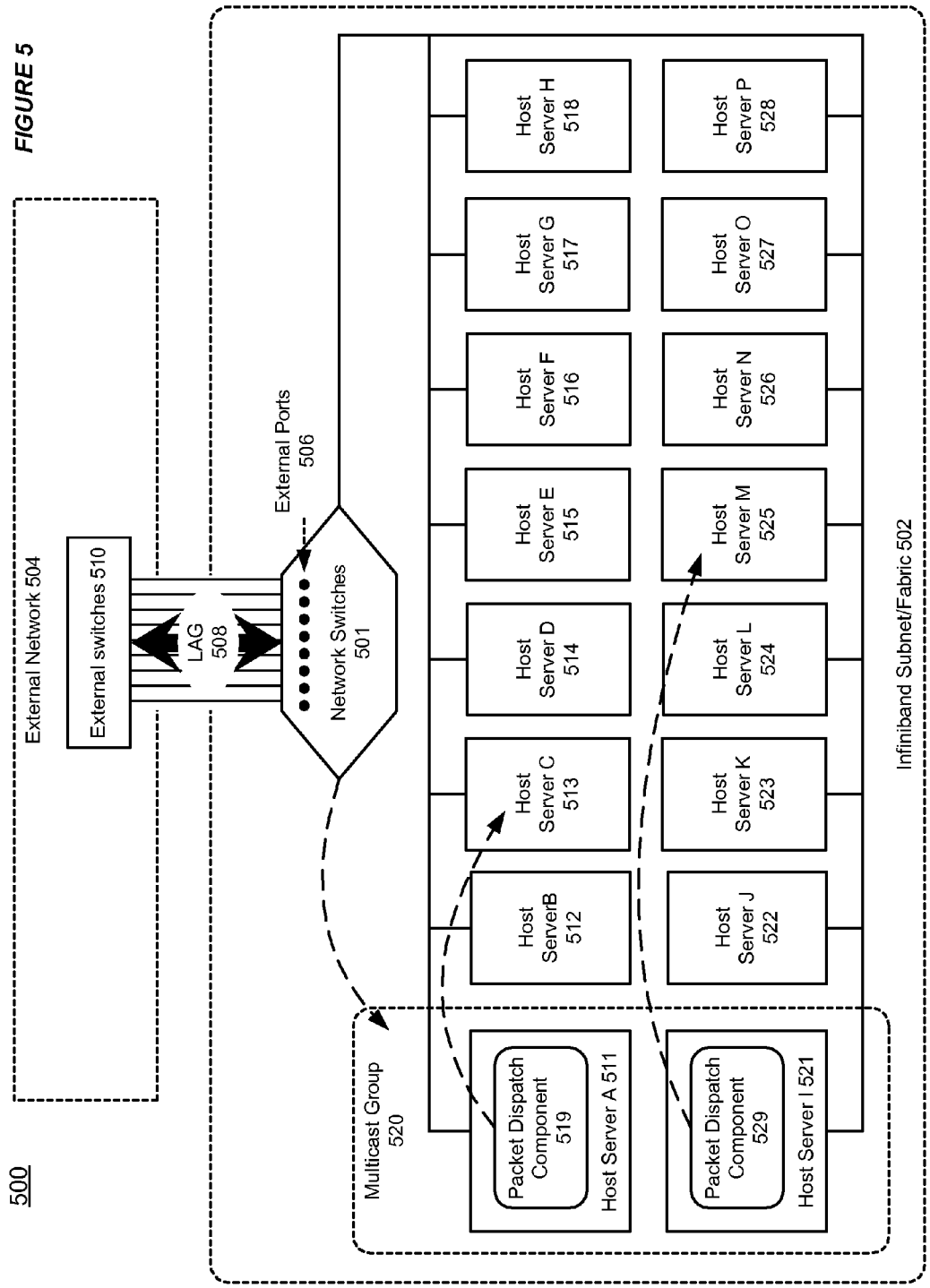
FIG. 5 shows an illustration of a multicast based packet intermediate forwarding mechanism in a middleware machine environment, in accordance with an embodiment of the invention.

FIG. 5 shows an illustration of a multicast based packet intermediate forwarding mechanism in a middleware machine environment, in accordance with an embodiment of the invention. As shown in FIG. 5, a middleware machine environment 500 allows an external switch 510 in an external network 504 to communicate with one or more network switches 501 in an IB fabric 502 using a LAG component 508. Additionally, the IB fabric 501 includes multiple host servers, e.g. host servers A-H 511-518 and host servers I-P 521-528.

When the network switch 501 receives a flood based packet at an external port 506, the gateway implementation on the network switch 501 can forward the packet to a multicast group 520. As shown in FIG. 5, the multicast group 520 can include multiple IFDs, e.g. host server A 511 and host server I 521. Furthermore, each member of the multicast group 520 can forward the received copy of the incoming packet to a host server that should receive the packet in a subset of the relevant destination servers. In the example as shown in FIG. 5, host sever A 511 can forward an incoming packet to the host servers B-H 512-518 using a packet dispatch component 519, while host sever I 521 can forward an incoming packet to the host servers J-P 522-528 using a packet dispatch component 529.

Depending on how much HCA bandwidth is available for external traffic, e.g. external EoIB traffic, having more servers in each flood multicast group 520 can reduce the packet destination miss rate. At the same time, the users can make sure that the ingress traffic to any HCA port, on the host servers A-H 511-518 and host servers I-P 521-528, does not exceed the link capacity, e.g. when individual VMs have almost all their I/O represented by bridged EoIB traffic via the gateway instances on the network switches 501.

Figure 6:
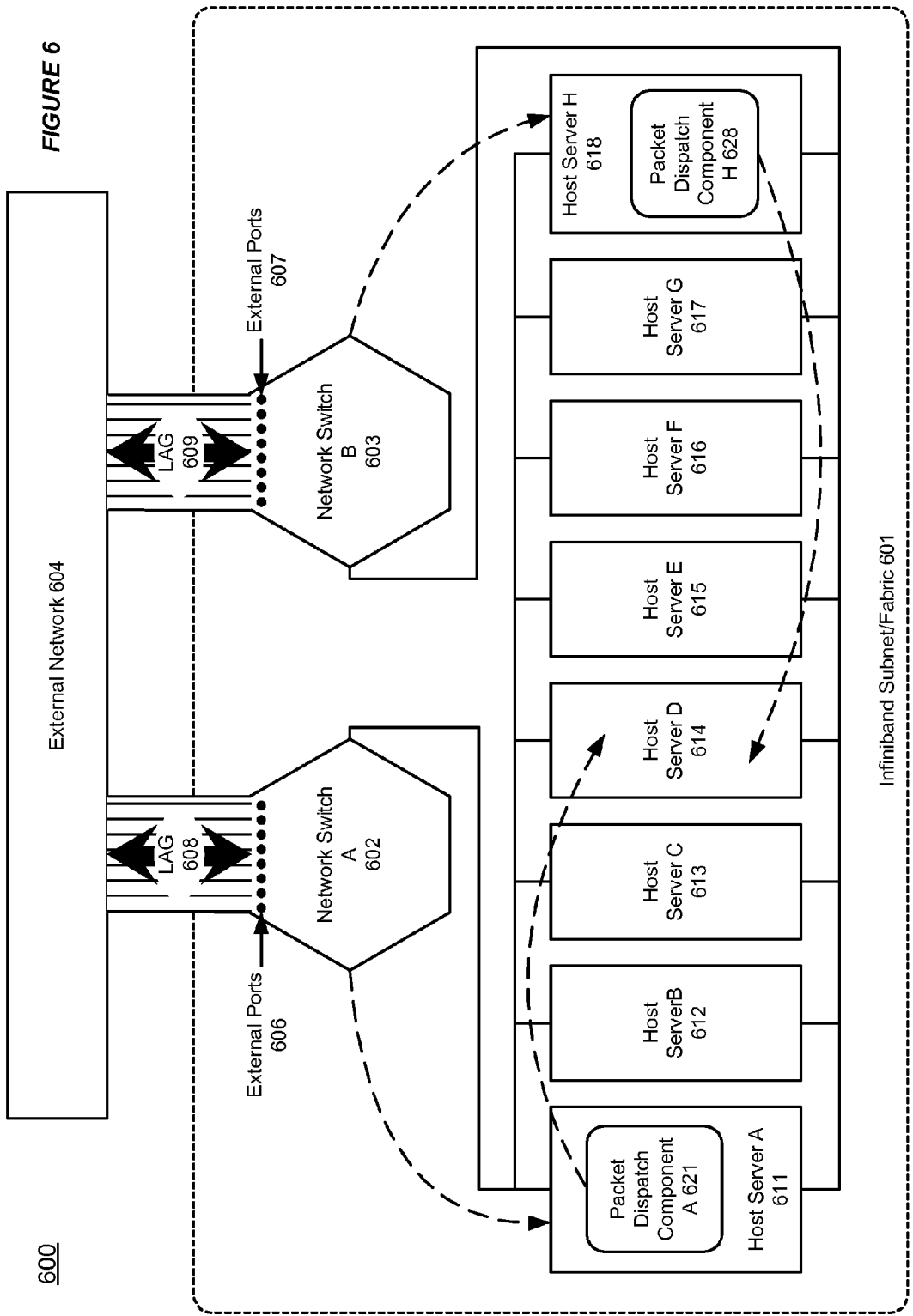
FIG. 6 shows an illustration of a packet intermediate forwarding mechanism for multiple LAG instances in a middleware machine environment, in accordance with an embodiment of the invention.

FIG. 6 shows an illustration of a packet intermediate forwarding mechanism for multiple LAG instances in a middleware machine environment, in accordance with an embodiment of the invention. As shown in FIG. 6, a middleware machine environment 600 allows an IB fabric 601 to communicate with an external network 604 using multiple LAG components 608 and 609. The host servers in the IB fabric 601, e.g. host servers A-H 611-618, can share the multiple LAG instances 608-609 on one or more gateway network switches A-B 602-603 (i.e. using the external ports 606-607).

In accordance with an embodiment of the invention, the IFDs for forwarding incoming packets received at the total set of LAG ports 608-609 can be divided among the total set of hosts A-H 611-618 using an optimal number of groups, e.g. multicast groups. In the example as shown in FIG. 6, a packet dispatching component A 621 on the host server A 611 can be responsible for forwarding packets received via the LAG instance 608, and a packet dispatching component H 628 on the host server H 618 can be responsible for forwarding packets received via the LAG instance 609.

As shown in FIG. 6, multiple copies of a single multicast packet may be received at a destination host server D 614, via different LAG instances 608-609, in the case when the total set of LAG instances 608-609 are presented to the host networking stack as a single logical network interface. The system can transparently filtering out additional copies of the received packet and ensures that a virtual machine on the destination host D server 614 only receives one copy of the packet. On the other hand, as long as each LAG instances 608-609 represents a separate logical network interface, the destination host server D 614 will not receive multiple copies of a single multicast packet.

Figure 7:
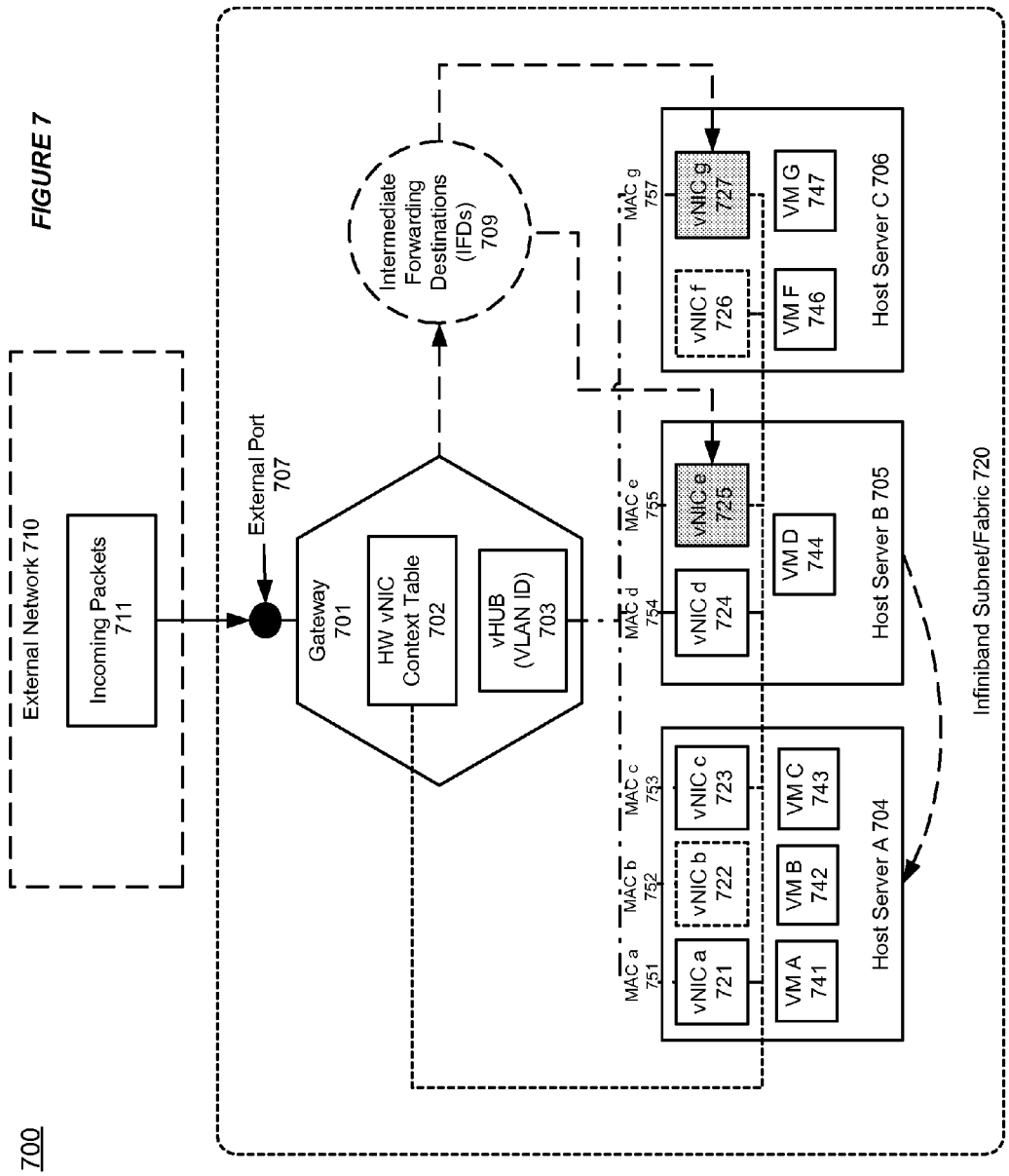
FIG. 7 shows an illustration of a flexible packet intermediate forwarding mechanism in a middleware machine environment, in accordance with an embodiment of the invention.

FIG. 7 shows an illustration of a flexible packet intermediate forwarding mechanism in a middleware machine environment, in accordance with an embodiment of the invention. As shown in FIG. 7, a middleware machine environment 700 allows a gateway instance 701 in an IB fabric 720 to receive incoming packets 711 from an external network 710, via an external port 707. Furthermore, the IB fabric 720 includes multiple host servers, e.g. host servers A-C 704-706. The host servers can provide various vNICs associates with multiple virtual machines, e.g. vNICs a-g 721-727 for VM A-D 741-744 and VM F-G 746-747. Additionally, the gateway instance 701 can include a virtual hub, e.g. vHUB 703, that includes MAC addresses, e.g. MAC a-e 751-755, and MAC g 757.

In accordance with an embodiment of the invention, a set of IFDs 709 can be supported for each external gateway port 707 in order to assist the gateway instance 701 to forward incoming packets 711 to the correct destination physical servers. The gateway instance 701 can evaluate various rules for matching a particular incoming packet to a particular IFD entry. These rules can associate the IFD entries with different VLAN ID ranges, and different source/destination MAC value ranges. In the example as shown in FIG. 7, an IFD entry can be associated with a vNIC e 725, while another IFD entry can be associated with a vNIC g 727. Furthermore, the incoming packet associated with vNIC b 722 can be sent to the vNIC e 725 on the host server B 705, before being forwarded to the destination host server A 704.

In accordance with an embodiment of the invention, users can configure the order in which the IFD entries 709 can be used for matching incoming packets, and to what extent the IFD entries can be matched before ordinary hardware vNIC context 702 matching takes place. Additionally, cost/flexibility/scalability requirements can define various implementation parameters, such as the number of IFD entries 709 supported directly by hardware logic, and to what extent a number of IFD entries 709 can be implemented via generic embedded programmable packet processing units.

Additionally, users can select a method to implement virtual interfaces on behalf of different virtual machines, based on pre-configured priority, observed amount of traffic, and Quality of Service (QOS)/Service Level Agreement (SLA) policies associated with different VMs. This method can include the use of dedicated hardware vNIC contexts 702. Additionally, with the introduction of multiple types of hardware or firmware based IFD entries, the selection of IFD type and IFD entry order can also be based on VM specific QOS/SLA policies.

Figure 8A:
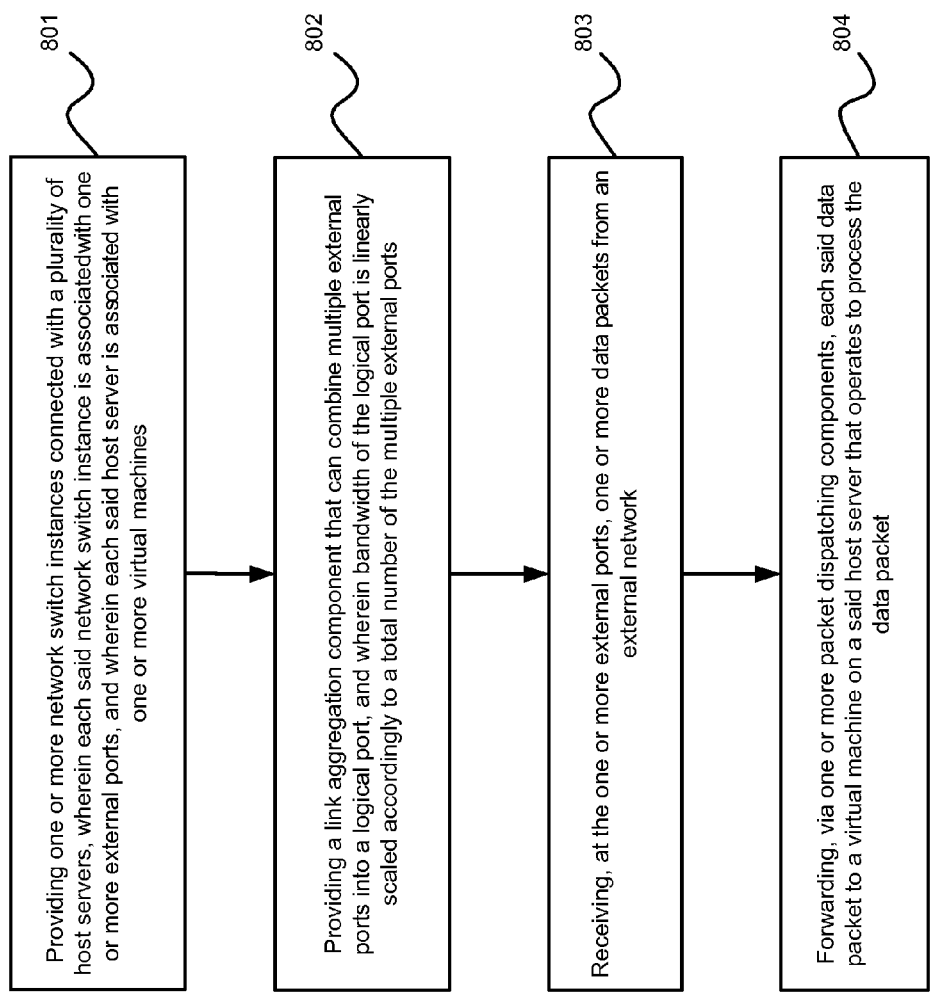
FIG. 8A illustrates an exemplary flow chart for supporting a packet intermediate forwarding mechanism in a middleware machine environment, in accordance with an embodiment of the invention.

FIG. 8A illustrates an exemplary flow chart for supporting a packet intermediate forwarding mechanism in a middleware machine environment, in accordance with an embodiment of the invention. As shown in FIG. 8A, at step 801, one or more network switch instances can be connected with a plurality of host servers, wherein each said network switch instance is associated with one or more external ports, and wherein each said host server is associated with one or more virtual machines. Additionally, at step 802, a link aggregation component can combine multiple external ports into a logical port, and wherein bandwidth of the logical port is linearly scaled accordingly to a total number of the multiple external ports. Then, at step 803, one or more data packets from an external network can be received at the one or more external ports. Finally, at step 804, the one or more packet dispatching components can forward each said data packet to a virtual machine on a said host server that operates to process the data packet.

Figure 8B:
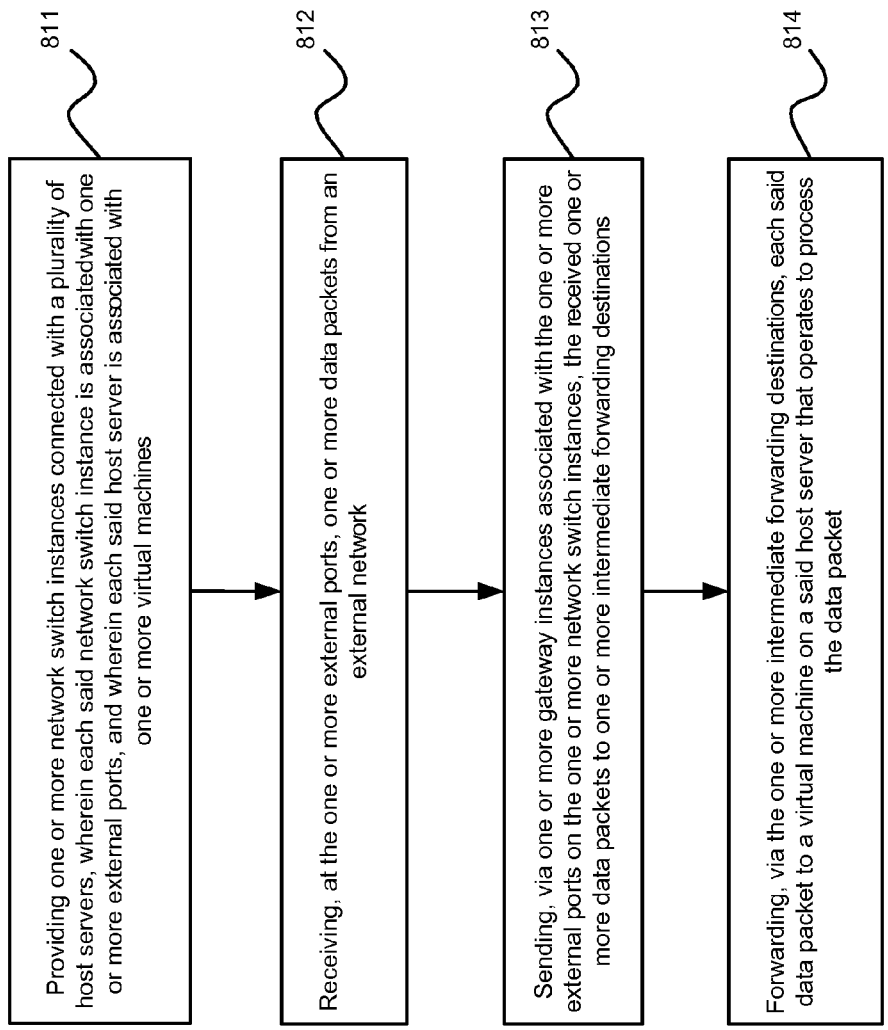
FIG. 8B illustrates an exemplary flow chart for using an intermediate forwarding destination in a middleware machine environment, in accordance with an embodiment of the invention.

FIG. 8B illustrates an exemplary flow chart for using an intermediate forwarding destination in a middleware machine environment, in accordance with an embodiment of the invention. As shown in FIG. 8, at step 811, one or more network switch instances can be connected with a plurality of host servers, wherein each said network switch instance is associated with one or more external ports, and wherein each said host server is associated with one or more virtual machines. Then, at step 812, one or more data packets from an external network can be received at the one or more external ports. Additionally, at step 813, one or more gateway (GW) instances associated with the one or more external ports on the one or more network switch instances can send the received one or more data packets to one or more intermediate forwarding destinations (IFDs). Finally, at step 814, the one or more IFDs can forward each said data packet to a virtual machine on a said host server that operates to process the data packet.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting scalable packet intermediate forwarding in a middleware machine environment operable on one or more microprocessors, comprising:
   a network switch instance connected with a plurality of host servers, wherein said network switch instance is associated with a plurality of external ports, each of which is adapted to receive one or more data packets from an external network, and
      wherein each of the plurality of host servers is connected to the network switch via a host channel adapter (HCA) port and associated with one or more virtual machines, and
      wherein each of the plurality of host servers is configured to communicate directly with each other of the plurality of host servers via a respective HCA port;
   a link aggregation component that combines the plurality of external ports into a logical port, and wherein bandwidth of the logical port is linearly scaled accordingly to a number of the plurality of external ports; and
   one or more packet dispatching components, each of which is associated with a different host server from the plurality of host servers that acts as an intermediate forwarding destination for incoming data packets without hardware context received at an external port;
      wherein a number of the one or more packet dispatching components is such that each of the one or more packet dispatching components acts as the intermediate forwarding destination for a subset of the plurality of host servers that does not exceed a number of the plurality of external ports;
      wherein each of the one or more packet dispatching components is responsible for forwarding a data packet without hardware context to a virtual machine that operates to process the data packet, the virtual machine residing on a host server associated with the packet dispatching component; and
      wherein the host servers associated with the one or more packet dispatching components comprise a flood multicast group.

2. The system according to claim 1, further comprising:
   a hardware context table that contains a plurality of contexts, which can be used to forward an incoming data packet to a host channel adapter port.

3. The system according to claim 1, wherein:
   at least one said intermediate forwarding destination in the multicast group operate to use a packet dispatching component from the one or more packet dispatching components to forward a data packet received at the multicast group to a said host server in the subset of said host servers.

4. The system according to claim 1, wherein:
   the plurality of host server shares multiple link aggregation component instances.

5. The system according to claim 4, wherein:
   each said link aggregation component instance is associated with a packet dispatch component associated with an intermediate forwarding destination, and wherein the packet dispatch component operates to forward a packet received at said link aggregation component instance to a destination host server.

6. The system according to claim 5, wherein:
   the destination host server operates to receive only one copy of a single multicast packet.

7. A method for supporting scalable packet intermediate forwarding in a middleware machine environment operable on one or more microprocessors, comprising:
   providing a network switch instance connected with a plurality of host servers, wherein said network switch instance is associated with a plurality of external ports, and
      wherein each of the plurality of host servers is connected to the network switch via a host channel adapter (HCA) port and associated with one or more virtual machines,
      wherein each of the plurality of host servers is configured to communicate directly with each other of the plurality of host servers via a respective HCA port;
   providing a link aggregation component that combines the plurality of external ports into a logical port, and wherein bandwidth of the logical port is linearly scaled accordingly to a number of the plurality of external ports;
   receiving, at the plurality of external ports, one or more data packets without hardware context from an external network; and
   forwarding, via one or more packet dispatching components each associated with a different host server from the plurality of host servers that acts as an intermediate forwarding destination for incoming data packets without hardware context received at an external port, each said data packet without hardware context to a virtual machine that operates to process the data packet;
      wherein a number of the one or more packet dispatching components is such that each of the one or more packet dispatching components acts as the intermediate forwarding destination for a subset of the plurality of host servers that does not exceed a number of the plurality of external ports; and
      wherein the host servers associated with the one or more packet dispatching components comprise a flood multicast group.

8. The method according to claim 7, further comprising:
providing a hardware context table that contains a plurality of contexts, which can be used to forward an incoming data packet to a host channel adapter port.

9. The method according to claim 7, further comprising:
allowing at least one said intermediate forwarding destination in the multicast group to use a packet dispatching component from the one or more packet dispatching components to forward a data packet received at the multicast group to a host server in the subset of said host servers.

10. The method according to claim 7, further comprising:
allowing the plurality of host server to share multiple link aggregation component instances.

11. The method according to claim 10, further comprising:
associating each said link aggregation component instance with a packet dispatch component associated with an intermediate forwarding destination, and wherein the packet dispatch component operates to forward a packet received at said link aggregation component instance to a destination host server.

12. A non-transitory machine readable storage medium having instructions stored thereon for supporting scalable packet intermediate forwarding in a middleware machine environment that when executed cause a system to perform the steps comprising:
providing a network switch instance connected with a plurality of host servers, wherein said network switch instance is associated with a plurality of external ports, and
wherein each of the plurality of host servers is connected to the network switch via a host channel adapter (HCA) port and associated with one or more virtual machines,
wherein each of the plurality of host servers is configured to communicate directly with each other of the plurality of host servers via a respective HCA port;
providing a link aggregation component that combines the plurality of external ports into a logical port, and wherein bandwidth of the logical port is linearly scaled accordingly to a number of the plurality of external ports;
receiving, at the plurality of external ports, one or more data packets without hardware context from an external network; and
forwarding, via one or more packet dispatching components each associated with a different host server from the plurality of host servers that acts as an intermediate forwarding destination for incoming data packets without hardware context received at an external port, each said data packet without hardware context to a virtual machine that operates to process the data packet;
wherein a number of the one or more packet dispatching components is such that each of the one or more packet dispatching components acts as the intermediate forwarding destination for a subset of the plurality of host servers that does not exceed a number of the plurality of external ports; and
wherein the host servers associated with the one or more packet dispatching components comprise a flood multicast group.

* * * * *

UNITED STATES PATENT AND TRADEMARK OFFICE
CERTIFICATE OF CORRECTION

PATENT NO. : 9,641,350 B2  
APPLICATION NO. : 13/546261  
DATED : May 2, 2017  
INVENTOR(S) : Bjørn Dag Johnsen et al.

Page 1 of 1

It is certified that error appears in the above-identified patent and that said Letters Patent is hereby corrected as shown below:

On the Title Page

On Page 3

Column 1, under Other Publications, Line 1, delete "PCle" and insert -- PCIe --, therefor.

Column 2, Line 12, deleted "Sates" and insert -- States --, therefor.

In the Drawings

On sheet 8 of 9, in FIGURE 8A, under Reference Numeral 801, Line 1, delete "associatedwith" and insert -- associated with --, therefor.

On sheet 9 of 9, in FIGURE 8B, under Reference Numeral 811, Line 1, delete "associatedwith" and insert -- associated with --, therefor.

In the Specification

In Column 2, Line 2, delete "Forschungszentrun" and insert -- Forschungszentrun --, therefor.

In Column 8, Line 47, delete "FIG. 8" and insert -- FIG. 8B --, therefor.

Signed and Sealed this  
Ninth Day of July, 2019

Andrei Iancu  
*Director of the United States Patent and Trademark Office*